(12) United States Patent
Bard et al.

(10) Patent No.: US 7,798,704 B2
(45) Date of Patent: Sep. 21, 2010

(54) SENSORS AND TEMPERATURE MEASUREMENT APPARATUS

(75) Inventors: Oliver Bard, Falkensee (DE); Wolfgang Grundmann, Birkenwerder (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/279,403

(22) PCT Filed: Feb. 13, 2007

(86) PCT No.: PCT/DE2007/000280

§ 371 (c)(1),
(2), (4) Date: Aug. 25, 2008

(87) PCT Pub. No.: WO2007/093162

PCT Pub. Date: Aug. 23, 2007

(65) Prior Publication Data

US 2008/0317092 A1    Dec. 25, 2008

(30) Foreign Application Priority Data

Feb. 15, 2006   (DE) .................. 10 2006 007 221

(51) Int. Cl.
G01K 3/00       (2006.01)
G01K 13/00      (2006.01)
G01K 1/00       (2006.01)
(52) U.S. Cl. ...................... 374/116; 374/208
(58) Field of Classification Search ................ 374/115, 374/116, 138, 208
See application file for complete search history.

(56) References Cited

U.S. PATENT DOCUMENTS

| 2,930,827 | A | * | 3/1960 | Schunke ................ 136/224 |
| 3,348,414 | A | * | 10/1967 | Waters et al. ........... 374/115 |
| 5,226,729 | A | | 7/1993 | Alford |
| 5,438,866 | A | | 8/1995 | McQueen |
| 5,780,737 | A | * | 7/1998 | Wible et al. ............. 73/204.22 |
| 6,270,253 | B1 | * | 8/2001 | Keller ..................... 374/138 |
| 6,762,671 | B2 | * | 7/2004 | Nelson ..................... 338/25 |
| 7,056,013 | B2 | * | 6/2006 | Anderson et al. ........ 374/138 |
| 2002/0163954 | A1 | * | 11/2002 | Park et al. ................ 374/185 |
| 2004/0264544 | A1 | * | 12/2004 | Fischer et al. ........... 374/208 |
| 2009/0207878 | A1 | * | 8/2009 | Bard et al. ............... 374/116 |

FOREIGN PATENT DOCUMENTS

| DE | 29 38 086 | 10/1980 |
| DE | 195 04 572 | 8/1996 |
| DE | 198 02 045 | 7/1999 |
| DE | 199 05 384 | 8/2000 |

OTHER PUBLICATIONS

International Search Report for PCT/DE2007/000280.
Written Opinion for PCT/DE2007/000280.
English translation of Written Opinion for PCT/DE2007/000280.

* cited by examiner

*Primary Examiner*—Lisa M Caputo
*Assistant Examiner*—Mirellys Jagan
(74) *Attorney, Agent, or Firm*—Fish & Richardson P.C.

(57) ABSTRACT

In general, a sensor for measuring a temperature of an air stream includes a sensing element for detecting temperature. The sensor also includes connection lines connected to the sensing element. The connection lines are configured to allow the air stream to circulate through the connection lines, capture heat of the air stream, and provide the heat to the sensing element.

13 Claims, 1 Drawing Sheet

SENSORS AND TEMPERATURE MEASUREMENT APPARATUS

CROSS REFERENCE TO RELATED APPLICATIONS

Pursuant to 35 USC §120, this application claims the benefit PCT/DE2007/000280 filed Feb. 13, 2007 which claims the benefit of German Patent Application No. 102006007221.9 filed Feb. 15, 2006. Each of these applications is incorporated by reference in its entirety.

BACKGROUND

Devices for performing temperature measurements are known from publications DE 2938086 B1 and DE 19504572 C2.

One task to be achieved consists in specifying a sensor that is suitable for measuring the temperature of an air stream to be monitored.

SUMMARY

A sensor with a sensing element and connection lines, which are connected to the sensing element and which are subjected to a greater air stream than the sensing element, will be specified. The sensing element is advantageously removed from the air stream to be monitored.

Because the quantity of heat to be measured is fed to the sensing element essentially by means of the connection lines, the measurement result corresponds less to the temperature at the location of the measurement sensor and therefore less to a local measurement result. Instead, an average value of the temperature is measured, wherein the averaging extends across the region that carries the air stream and through which the connection lines run.

The sensing element can be, e.g., a non-encapsulated or encapsulated NTC element (heat conductor). NTC stands for Negative Temperature Coefficient. Other temperature sensors can also be considered.

Because the sensing element is advantageously a point sensor, temperature integration possible through the connection lines exposed to the air stream is especially advantageous for applications, such as air-conditioning systems, which generate flow components with different temperatures.

Preferred constructions will also be described.

In the temperature measurement, the connection lines are exposed to a stronger air stream to be monitored in terms of flow density than the sensing element.

In one variant, the sensor comprises a carrier, which has a guide device for guiding connection lines.

The connection lines advantageously extend in the longitudinal direction of the carrier. The guide device is advantageously permeable for the air stream in the flow direction, so that a large portion of the air stream can reach the connection lines directly. Advantageously, air flows around the connection lines essentially on all sides, in an especially preferred way both from the top side and also from the bottom side.

For this purpose, three or more guide surfaces are suitable, which are oriented parallel to the longitudinal axis of the sensor. The guide surfaces are advantageously oriented in the radial direction (in the shape of a star) perpendicular to the longitudinal axis of the sensor. For stabilizing the described surface arrangement, stabilization elements can be provided, which are arranged perpendicular to the guide surfaces and which are connected rigidly to these surfaces.

The connection lines can also be arranged in a hollow space, which is constructed in the carrier and which is advantageously at least partially permeable for the air stream to be monitored.

The guide device is advantageously oriented relative to the air stream to be monitored such that air flows around the connection wires of the sensing element perpendicular to the longitudinal direction.

In one advantageous variant, the sensing element is at least partially shielded from the air stream. The sensing element is advantageously arranged in a chamber, which is suitable as shielding from the air stream and which is isolated from the guide device, i.e., is essentially inaccessible for the air stream. The sensing element is essentially removed from the air stream by the shielding.

The connection lines are storage elements for capturing the heat of the air stream. The heat captured by the connection lines is integrated over the length of the line. The connection lines thus provide averaging of the heat flux, which is fed to the sensing element. The length of the guide device advantageously equals at least five times the length of the chamber for holding the sensing element.

The connection lines contain an electrically conductive material, e.g., copper, which is suitable for conducting heat.

The sensor can be used in a temperature measurement device. Here it is advantageously mounted on a carrier in such a way that the connection lines are oriented perpendicular to the main flow direction of the air stream to be monitored.

DESCRIPTION OF THE DRAWINGS

Advantageous embodiments will be explained with reference to schematic figures that are not shown true to scale. Shown are.

DETAILED DESCRIPTION

Figure 1:
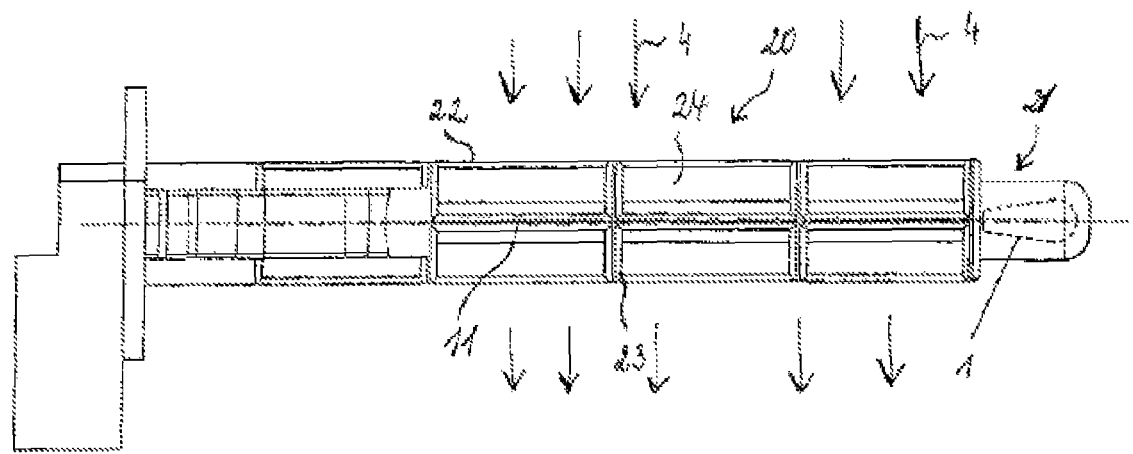
FIG. 1, in cross section, a sensor with a sensing element and connection lines, which are suitable for capturing the heat of an air stream to be monitored and for feeding this heat to the sensing element, FIG. 2, the sensor according to FIG. 1 in a perspective view.
Figure 2:
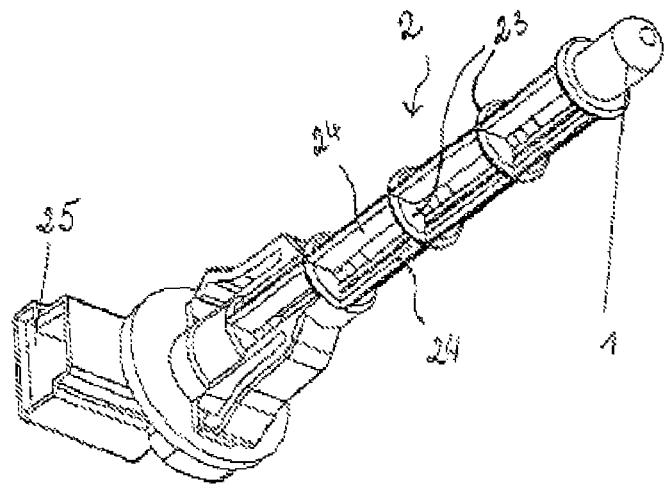

FIGS. 1, 2 show, in different views, a sensor with a sensing element 1 and a carrier 20. Two connection lines 11 are connected to the sensing element 1. The connection lines 11 can be bare wires. The connection lines 11 can also be electrically insulated wires. They can each be covered, for example, by a thin, electrically insulating coating.

The carrier 20 has a longitudinal axis. The carrier comprises a guide device 22, in which the connection lines 11 are guided. This guide device extends along the longitudinal axis of the carrier and is advantageously permeable for the air stream at least in the main flow direction (which runs from top to bottom in FIG. 1).

The guide device 22 comprises three guide surfaces 24, which are oriented parallel to the longitudinal axis of the sensor.

Between the edges of the guide surfaces 24 facing each other, a guide channel, which is open in the radial direction and which extends along the longitudinal axis, is formed for guiding the connection lines. The guide surfaces 24 are oriented in the radial direction perpendicular to the longitudinal axis of the sensor in cross section. For stabilizing the described surface arrangement, stabilization elements 23 are provided, which are arranged perpendicular to the guide surfaces 24 and which are connected rigidly to these surfaces.

The guide device 22 is advantageously permeable essentially on all sides for the air stream up to the regions, which are shielded by the advantageously relatively thin-walled guide surfaces 24. The longitudinal axis of the carrier is advantageously oriented perpendicular to the main direction of the air stream 4.

On the front face of the carrier, a chamber 21 for holding the sensing element 1 is arranged, which is advantageously insulated from the guide device 22.

The air stream 4 flows around the carrier mainly in the region of the guide device 22. In contrast, the chamber 21 is advantageously removed from the main flow region. Even if the chamber 21 is exposed to the air stream, the sensing element 1 is insulated from this by the wall of the chamber.

The sensing element can also be covered by a shielding layer, which has lower heat conductivity than the base material of the connection lines. The ratio of the heat lines advantageously equals at least a factor of two. The shielding layer or the chamber 21 is used advantageously for encapsulating the sensing element 1 and for guaranteeing protection from harmful environmental influences.

The carrier 20 is connected to a holder 25, which advantageously comprises a plug connection with contact elements for making electrical contact with the connection lines 11. The base material of these contact elements advantageously has a lower thermal conduction coefficient than the connection lines 11. Thus, the heat is essentially not drawn away to the end of the connection lines 11 away from the sensing element 1.

The invention claimed is:

1. A sensor for measuring a temperature of an air stream comprising:
    a sensing element for detecting temperature, the sensing element being shielded at least partially from the air stream, and
    connection lines connected to the sensing element and extending in a single direction from a single side of the sensing element, the connection lines configured to:
        allow the air stream to circulate through the connection lines,
        capture heat of the air stream, and
        provide the heat to the sensing element; and a guide device configured to guide the connection lines;
    wherein the sensing element is in a chamber which is insulated from the guide device.

2. The sensor of claim 1 wherein a flow density of the air stream in the connection lines is greater than a flow density of the air stream in the sensing element when the temperature is being measured.

3. The sensor of claim 1 further comprising a carrier comprising the guide device, the guide device configured to allow an air stream to flow through the guide device,
    wherein the guide device guides the connection lines, and is at least partially permeable for the air stream in a flow direction.

4. The sensor of claim 1, wherein the chamber has a maximum length equal to one fourth of the length of the guide device.

5. The sensor of claim 1 wherein the connection lines are substantially perpendicular to a main flow direction of the air stream.

6. The sensor of claim 1 wherein the connection lines comprise a material that conducts heat.

7. The sensor of claim 6, wherein the material is copper.

8. A sensor for measuring a temperature of an air stream comprising:
    a sensing element for detecting temperature, and
    connection lines connected to the sensing element, the connection lines configured to:
        allow the air stream to circulate through the connection lines,
        capture heat of the air stream, and
        provide the heat to the sensing element;
    wherein the sensing element is shielded at least partially from the air stream and the sensing element is in a chamber which is insulated from a guide device, the chamber having a maximum length equal to one fourth of the length of the guide device.

9. The sensor of claim 8 wherein a flow density of the air stream in the connection lines is greater than a flow density of the air stream in the sensing element when the temperature is being measured.

10. The sensor of claim 8 further comprising a carrier comprising the guide device, the guide device configured to allow an air stream to flow through the guide device,
    wherein the guide device guides the connection lines, and is at least partially permeable for the air stream in a flow direction.

11. The sensor of claim 8 wherein the connection lines are substantially perpendicular to a main flow direction of the air stream.

12. The sensor of claim 8 wherein the connection lines comprise a material that conducts heat.

13. The sensor of claim 12, wherein the material is copper.

* * * * *

UNITED STATES PATENT AND TRADEMARK OFFICE
CERTIFICATE OF CORRECTION

PATENT NO.        : 7,798,704 B2                                        Page 1 of 1
APPLICATION NO.   : 12/279403
DATED             : September 21, 2010
INVENTOR(S)       : Oliver Bard and Wolfgang Grundmann It is certified that error appears in the above-identified patent and that said Letters Patent is hereby corrected as shown below:

Column 3, lines 31-45

Delete Claim 1 "1. A sensor for measuring a temperature of an air stream comprising: a sensing element for detecting temperature, the sensing element being shielded at least partially from the air stream, and connection lines connected to the sensing element and extending in a single direction from a single side of the sensing element, the connection lines configured to: allow the air stream to circulate through the connection lines, capture heat of the air stream, and provide the heat to the sensing element; and a guide device configured to guide the connection lines; wherein the sensing element is in a chamber which is insulated from the guide device."

and Insert -- 1. A sensor for measuring a temperature of an air stream comprising: a sensing element for detecting temperature, the sensing element being shielded at least partially from the air stream, and connection lines connected to the sensing element and extending in a single direction from a single side of the sensing element, the connection lines configured to: allow the air stream to circulate through the connection lines, capture heat of the air stream, and provide the heat to the sensing element;
  and a guide device configured to guide the connection lines; wherein the sensing element is in a chamber which is insulated from the guide device. --, therefore.

Signed and Sealed this
Fifteenth Day of March, 2011

David J. Kappos
*Director of the United States Patent and Trademark Office*